United States Patent [19]

Nagayama

[11] Patent Number: 5,503,596
[45] Date of Patent: Apr. 2, 1996

[54] METHOD OF MANUFACTURING TEE NUTS

[75] Inventor: Yutaka Nagayama, Osaka, Japan

[73] Assignee: Nagayama Electronic Industry Co., Ltd., Wakayama, Japan

[21] Appl. No.: 206,886

[22] Filed: Mar. 7, 1994

[30] Foreign Application Priority Data

May 14, 1993 [JP] Japan .................................. 5-112641
Oct. 27, 1993 [JP] Japan .................................. 5-268820

[51] Int. Cl.$^6$ .......................... B21D 22/00; B21D 53/24; B21K 1/64
[52] U.S. Cl. .................................. 470/25; 72/356; 72/334; 420/20
[58] Field of Search .................. 470/18, 25, 20; 72/333, 334, 348, 354.6, 354.8, 355.2, 355.4, 355.6, 356, 404, 379.2

[56] References Cited

U.S. PATENT DOCUMENTS

| | | |
|---|---|---|
| 945,737 | 1/1910 | Anderson . |
| 1,724,486 | 8/1929 | Karmazin ................................. 72/356 |
| 1,873,894 | 8/1932 | Kimbell . |
| 2,102,558 | 12/1937 | Johnson . |
| 2,286,982 | 6/1942 | Todd . |
| 2,583,270 | 1/1952 | Lynall ..................................... 72/358 |
| 2,743,518 | 5/1956 | Zahodiakin ............................. 72/356 |
| 2,908,920 | 10/1959 | Hughes . |
| 3,125,146 | 3/1964 | Rosan . |
| 3,208,135 | 9/1965 | Newbold et al. . |
| 3,270,610 | 9/1966 | Knowlton . |
| 3,281,171 | 10/1966 | Hughes . |
| 3,358,727 | 12/1967 | Hughes . |
| 3,480,061 | 11/1969 | Leistner . |
| 3,765,217 | 10/1973 | Ikeda ...................................... 72/334 |
| 3,910,331 | 10/1975 | Randall . |
| 4,400,965 | 8/1983 | Schey ...................................... 72/334 |
| 4,508,478 | 1/1985 | Leistner . |
| 4,911,592 | 3/1990 | Muller . |
| 5,195,854 | 3/1993 | Nagayama . |
| 5,238,344 | 8/1993 | Nagayama . |
| 5,348,432 | 9/1994 | Nagayama . |

FOREIGN PATENT DOCUMENTS

| | | |
|---|---|---|
| 636542 | 6/1983 | Switzerland . |
| 1157734 | 7/1969 | United Kingdom . |

Primary Examiner—Lowell A. Larson
Assistant Examiner—Rodney A. Butler
Attorney, Agent, or Firm—W. G. Fasse; W. F. Fasse

[57] ABSTRACT

In order to manufacturer a tee nut by plastic working steps, a swollen portion is formed on a metal plate, a through hole is formed in the forward end surface of this swollen portion, and then the outer diameter and therewith the wall thickness of a forward end portion of the swollen portion is relatively reduced as compared to a base portion of the swollen portion. Then, the outer and inner diameters of the base portion are reduced while substantially maintaining its wall thickness. Thus, the forward end portion defines a relatively thin portion to be caulked, and the base portion defines a relatively thick female screw forming portion of the tee nut. Thus, it is possible to form a tee nut having a shaft with a uniform outer diameter and having a relatively thin forward end portion forming the portion to be caulked while the tee nut is held by the metal plate.

20 Claims, 11 Drawing Sheets

METHOD OF MANUFACTURING TEE NUTS

BACKGROUND OF THE INVENTION

1. Field of the Invention

The present invention relates to a method of manufacturing a tee nut, and especially a tee nut comprising a relatively thin portion to be caulked or flared, which is provided on a forward end of a hollow shaft portion.

2. Description of the Background Art

FIG. 12 is a perspective view showing a conventional tee nut 1, which is of interest to the present invention. The tee nut 1 comprises a shaft portion 2 and a flange portion 3 outwardly extending from a first end of the shaft portion 2, which are integrally made of a metal material. The shaft portion 2 is in the form of a hollow cylinder, which is provided with a female screw threading 4 on its inner peripheral surface. The female screw threading 4 is formed along the entire inner peripheral surface of the shaft portion 2.

On the other hand, the flange portion 3 is provided with two pairs of pawls 5, 6, 7 and 8, which are arranged radially opposite each other on the flange portion 3, extending from the first end toward a second end of the shaft portion 2. These pawls 5 to 8 are formed by upwardly bending parts of the outer peripheral edge of the flange portion 3.

Such a tee nut 1 is fixed to an object such as a timber, for example, by inserting the shaft portion 2 in a hole that has been previously provided in the object, and then driving the pawls 5 to 8 into the object. Upon such fixing to the object, the tee nut 1 is inhibited from rotation so that a screw member such as a bolt can be screwed into and engaged with the female screw threading 4 which is formed on the inner peripheral surface of the shaft portion 2.

Such a tee nut 1 is generally called a "hopper feed tee nut", since the tee nut 1 can be smoothly and automatically fed and moved along a feed track provided on a nut fixing tool for fixing the nut to the object. For example, British Patent No. 1,157,734 describes a type of such a hopper feed tee nut in detail.

FIG. 12 shows the aforementioned feed track 9 in phantom lines. This feed track 9 comprises a pair of guide rails 10 and 11 having C-shaped sections, which are symmetrically arranged to be opposite to each other. The flange portion 3 is received in these guide rails 10 and 11, so that the tee nut 1 is moved along the feed track 9 in a prescribed orientation while locating the pawls 5 to 8 between the guide rails 10 and 11. The feed track 9 may be curved to bring the tee nut 1 into a desired orientation and position, although such a bent state is not shown in FIG. 12, so that the shaft portion 2 is aligned with a hole that has been provided in the object (not shown).

However, a disadvantage of such a conventional tee nut 1 is that its condition of being fixed to the object is maintained substantially only by the pawls 5 to 8 biting into the object. The pawls 5 to 8 may become so loosened from the object over time, that the tee nut 1 can come completely loose and fall out of the object in the worst case. FIGS. 13 and 14 show another conventional tee nut 12, which has been proposed in order to solve such a problem. FIGS. 13 and 14 are a front elevational view and a bottom plan view showing the tee nut 12 respectively.

This tee nut 12 comprises a shaft portion 13 and a flange portion 14 outwardly extending from a first end of the shaft portion 13, which are integrally made of a metal material, similarly to the aforementioned tee nut 1. The shaft portion 13 is in the form of a hollow cylinder and has a portion 15 to be caulked, sprayed or flared at a second end opposite the first end, while a female screw threading 16 is formed on an inner peripheral surface portion excluding the portion 15 to be caulked. The portion 15 to be caulked has a relatively small thickness.

On the other hand, the flange portion 14 is provided with two pairs of pawls 17, 18, 19 and 20, which are arranged radially opposite to each other on the flange portion 14, extending from the first end toward the second end of the shaft portion 13. These pawls 17 to 20 are formed by upwardly bending parts of the outer peripheral edge of the flange portion 14.

Such a tee nut 12 is used in the manner shown in FIG. 15, for example. Referring to FIG. 15, an object 21 such as a timber for example, has previously been provided with a through hole 22. The shaft portion 13 of the tee nut 12 is inserted in this through hole 22. In this state, the portion 15 to be caulked shown in FIG. 13 is splayed open ad flared or caulked by a caulker, so that a caulked portion 15a is formed on one surface of the object 21. At the same time, the pawls 17 to 20 are driven into the other surface of the object 21. Thus, the tee nut 12 is completely fixed to the object 21 from both sides so that it cannot fall out.

In such a mounting state of the tee nut 12, the pawls 17 to 20 inhibit the tee nut 12 from rotation with respect to the object 21, while the flange portion 14 and the caulked portion 15a hold the object 21 to inhibit disengagement of the tee nut 12 from the through hole 22. Thus, the tee nut 12 is strongly fixed to the object 21, and such a fixed state is semipermanently maintained.

This tee nut 12 is also used as a "hopper feed tee nut", similarly to the aforementioned tee nut 1. Therefore, the tee nut 12 can also be moved along the feed track 9 shown in FIG. 12. When a plurality of such tee nuts 12 are moved along the feed track 9, however, the movement is frequently hindered as follows.

The flange portion 14 of the tee nut 12 is substantially in the form of a circle before formation of the pawls 17 to 20. Therefore, the remaining part of the flange extending between the pair of pawls 17 and 18 and the other pair of pawls 19 and 20 has arcuate sides 23 and 24 respectively. When a plurality of tee nuts 12 are serially moved along the feed track 9 (see FIG. 12), the curved sides of the flange portions 14 tend to overlap with those of adjacent tee nuts 12. Consequently, the tee nuts 12 are frequently misfed or jammed along the feed track 9.

On the other hand, the flange portion 3 of the tee nut 1 shown in FIG. 12 is in the form of an octagon as a whole, and the flange edges extending respectively between the two pairs of pawls 5, 6, 7 and 8 have linear sides 25 and 26 respectively. When a plurality of such tee nuts 1 are fed along the feed track 9, the linear flange sides 25 and 26 of the flange portions 3 positively butt against one another and very rarely cause the aforementioned overlapping phenomenon.

Thus, it is expected to be possible to reduce the aforementioned overlapping phenomenon in the tee nut 12 shown in FIGS. 13 and 14 by changing the shapes of the arcuate sides 23 and 24 of the flange portion 14 to a flat or linear shape. However, the arcuate shape of the sides cannot be so easily changed, as hereinafter described, and in practice it is impossible to find such a modified tee nut in the market.

In general, the tee nut 12 is obtained by drawing a longitudinal strip-shaped metal plate. Such a strip-shaped metal plate is fed along a progressive die to be worked in steps in a prescribed order, so that an intermediate product is separated from the strip-shaped metal plate at a stage that must thereafter be subjected to some further working for obtaining the tee nut 12. This intermediate product has portions corresponding to the shaft portion 13 and the flange portion 14, with slits for forming the pawls 17 to 20. The intermediate product is then grasped by a chuck at the flange portion 14, so that the portion 15 to be caulked and the female screw threading 16 can be formed in the shaft portion 13 in this state. The portion 15 to be caulked is formed by cutting the inner peripheral surface of the shaft portion 13 with a cutting tool for reducing the thickness. Thereafter the pawls 17 to 20 are raised up from the flange portion 14, to obtain the desired tee nut 12.

The flange portion 14 is substantially circular shaped at the stage before formation of the pawls 17 to 20 as hereinabove described, so that the circular flange can be grasped in a chuck for machining, i.e. cutting or milling the interior of the shaft portion 13 for obtaining the portion 15 to be caulked. If the flange portion 14 to be grasped by the chuck has a substantially circular shape, it is possible to grasp the flange portion 14 in the chuck while properly centering the shaft portion 13, since the flange portion 14 has no directivity with respect to such chucking. In this case, further, the flange portion 14 has no corners along its outer periphery, whereby no flash is caused by the chuck grasping the flange portion 14 since no part of the outer periphery of the flange portion 14 will be crushed.

On the other hand, it is difficult to grasp the flange portion 3 having a substantially octagonal shape as shown in FIG. 12 in a chuck due to its directivity, while it is also difficult to center the shaft portion 2. When the flange portion 3 is grasped by a chuck, corners of the flange portion 3 may be compressively deformed to result in flashes. Such flashes inhibit the tee nut 1 from smoothly moving along the feed track 9. While a chuck having a special configuration may be employed in order to solve the aforementioned problem, it would then be necessary to uniformly insert each flange portion 3 of each tee nut into the chuck in a particular orientation, which results in a complicated operation.

In the tee nut 12 having the portion 15 to be caulked as shown in FIGS. 13 and 14, therefore, the flange portion 14 must be substantially in the form of a circle in a stage before formation of the pawls 17 to 20.

SUMMARY OF THE INVENTION

Accordingly, an object of the present invention is to provide a method of manufacturing a tee nut which can form a relatively thin portion to be caulked with no cutting, in order to solve the aforementioned problems.

The present invention is directed to a method of manufacturing a tee nut comprising a shaft and a flange outwardly extending from a first end of the shaft, which are integrally made of a metal material. The shaft is in the form of a hollow cylinder having a uniform outer diameter, and comprises a female screw forming portion, having a relatively small inner diameter and a relatively large thickness with a female screw threading formed on its inner peripheral surface, provided on a first end, and a portion to be caulked, having a relatively large inner diameter and a relatively small thickness, provided on a second end opposite the first end.

In order to solve the aforementioned technical problems, the method according to the present invention comprises respective steps of preparing a metal plate, locating a first portion for defining the flange on the metal plate, swelling a central part of the first portion toward one major surface of the metal plate thereby forming a swollen for defining the shaft portion, providing a through hole in the forward end surface of the swollen portion, making a forward end portion of the swollen portion corresponding to the portion to be caulked smaller in outer diameter as compared with a base portion corresponding to the female screw forming portion thereby reducing the thickness of the forward end portion to be smaller than that of the base portion, then reducing the outer and inner diameters of the base portion while substantially maintaining its thickness, and forming a female screw threading on the inner peripheral surface of the base portion of the swollen portion.

According to the present invention, the metal plate is preferably prepared from a longitudinal strip-shaped one, and the step of locating the portion for defining the flange, the step of forming the swollen portion, the step of providing the through hole, the step of reducing the thickness of the forward end portion to be smaller than that of the base portion, and the step of reducing the outer and inner diameters of the base portion are carried out while feeding the strip-shaped metal plate along a progressive die. In this case, the inventive method may further comprise a step of separating the portion defining the flange portion from the strip-shaped metal plate.

The step of reducing the thickness of the forward end portion to be smaller than that of the base portion preferably includes a step of uniformly enlarging the inner diameter of the swollen portion while controlling enlargement of the outer diameter of the forward end portion.

The step of reducing the outer and inner diameters preferably includes a step of actuating a forming die having a surface for inwardly pressing the outer peripheral surface of the base portion. In this case, the step of reducing the outer and inner diameters of the base portion is preferably carried out in a plurality of stages.

In order to form a relatively thin portion to be caulked on a second end while forming a relatively thick female screw forming portion on a first end in a shaft portion having a uniform outer diameter, a forward end portion of a swollen portion corresponding to the portion to be caulked is relatively reduced in outer diameter as compared with a base portion corresponding to the female screw forming portion, thereby reducing the forward end portion in thickness to be smaller than the base portion according to the present invention. Then, the outer and inner diameters of the base portion are reduced while substantially maintaining its thickness. Thus, it is possible to provide the shaft with a relatively thick portion for defining the female screw forming portion and a relatively thin portion for defining the portion to be caulked by plastic working such as forging, for example, with no cutting.

According to the present invention, as hereinabove described, the thin portion for defining the portion to be caulked can be formed not by cutting but by plastic working, whereby such plastic working can be carried out through a series of steps for forming a swollen portion that will define the shaft of the tee nut. Thus, it is possible to efficiently manufacture the tee nut. Particularly when the metal plate is prepared from a longitudinal strip-shaped plate and fed along a progressive die to carry out various steps for obtaining the tee nut, it is possible to form the aforementioned thin portion for defining the portion to be caulked along the progress of the strip-shaped metal plate. Thus, it is not necessary to handle individual parts in the form of an intermediate product in a complicated manner, so that the efficiency of manufacturing the tee nut can be further improved.

According to the present invention, further, it is not necessary to apply a cutting tool such as a drill to formation of the thin portion for defining the portion to be caulked. Therefore, the flange does not need to be grasped by a chuck, so that it can have an angular shape with no problem. Thus, the present invention can be advantageously applied to manufacturing a tee nut comprising an angular flange provided on its outer periphery with two pairs of pawls arranged radially opposite each other so that the side edges of the flange extending respectively between the two pairs of pawls having a linear or straight shape. When a plurality of such tee nuts are moved along a feed track in series, the respective flanges of each adjacent pair of tee nuts are in contact with each other along the linear sides extending between the paired pawls. Therefore, the flange portions hardly or rarely overlap with each other, whereby the tee nuts can be smoothly moved along the feed track. When such a tee nut is fixed to an object, the pawls bite into the object to inhibit the tee nut from rotation with respect to the object, while the portion to be caulked is so caulked as to hold the object between the caulked portion and the flange, thereby inhibiting the tee nut and the pawls from displacement from the object. Consequently, the tee nut can be strongly fixed to the object, and the fixed state of the tee nut can be maintained even if dimensional change, such as contraction upon drying of a timber, for example, is caused in the object over time.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention can be advantageously applied to manufacturing a tee nut proposed in Japanese Patent Application No. 5-112641 (1993) and corresponding U.S. Pat. No. 5,348,432 (Nagayama) issued Sep. 20, 1994, which is commonly assigned with the present application. For example, the present method can be used to manufacture a tee nut comprising a shaft provided with a relatively thin portion to be caulked and an angular flange provided with two pairs of pawls arranged on its outer periphery at radially opposite positions so that paired ones of the two pairs of pawls are respectively coupled with each other by linear sides of the flange.

Figure 1:
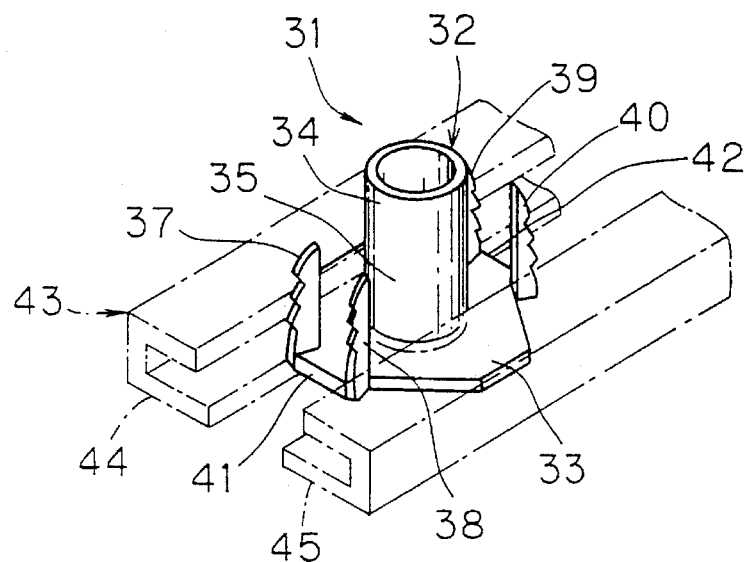
FIG. 1 is a perspective view showing a tee nut 31 obtained by a manufacturing method according to a first embodiment of the present invention.
Figure 2:
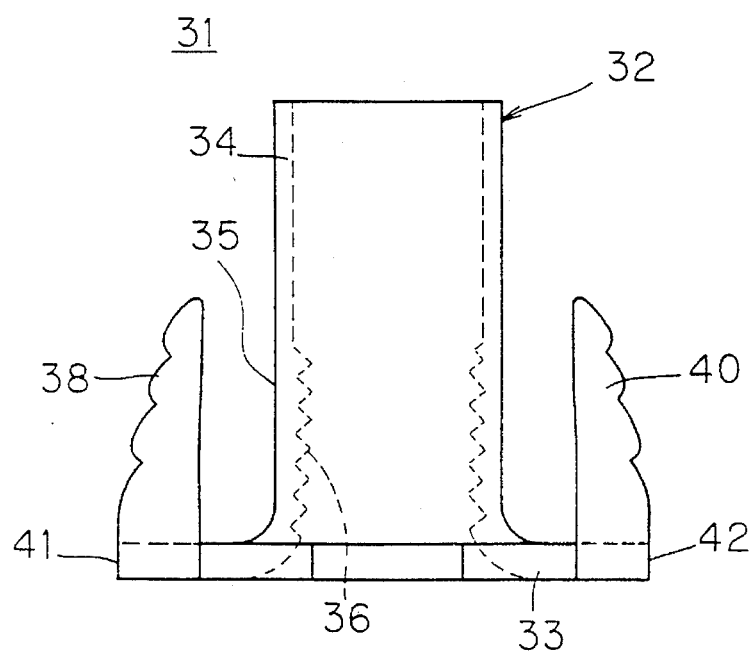
FIG. 2 is a front elevational view of the tee nut 31 shown in FIG. 1.
Figure 3:
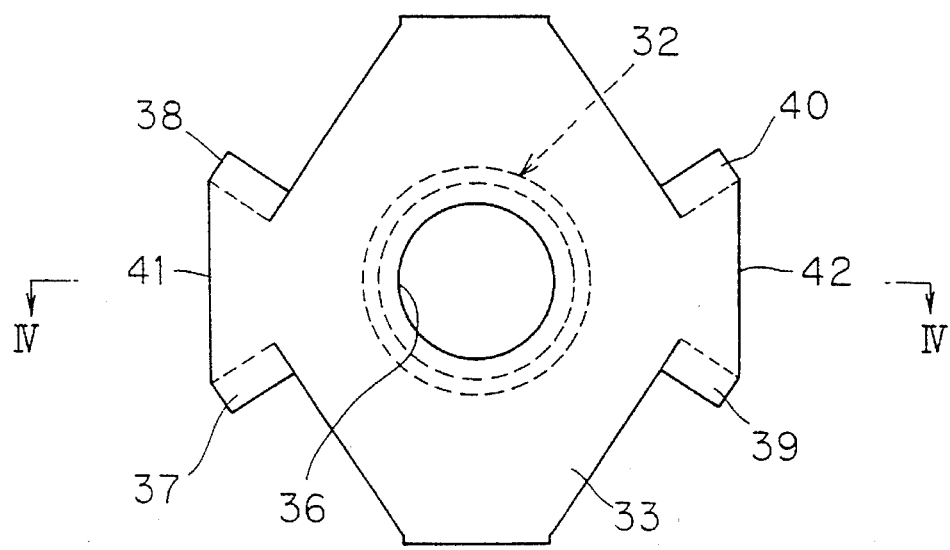
FIG. 3 is a bottom plan view of the tee nut 31 shown in FIG. 1.
Figure 4:
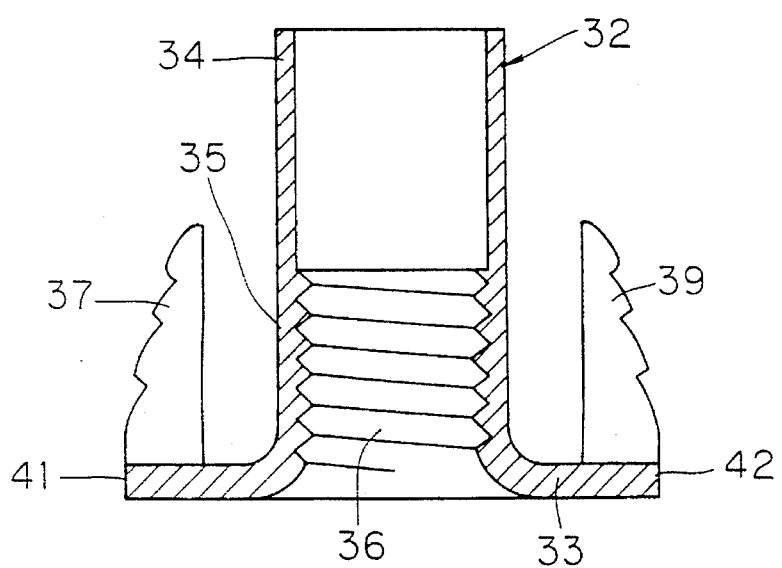
FIG. 4 is a sectional view taken along the line IV—IV in FIG. 3.

FIGS. 1 to 4 show a tee nut 31 obtained by a manufacturing method according to a first embodiment of the present invention. FIG. 1 is a perspective view, FIG. 2 is a front elevational view, FIG. 3 is a bottom plan view and FIG. 4 is a sectional view taken along the line IV—IV in FIG. 3, of the tee nut 31, respectively.

The tee nut 31, which is integrally obtained by drawing a ferrous metal plate, for example, comprises a shaft 32 and a flange 33 outwardly extending from a first end of the shaft 32.

Figure 13:
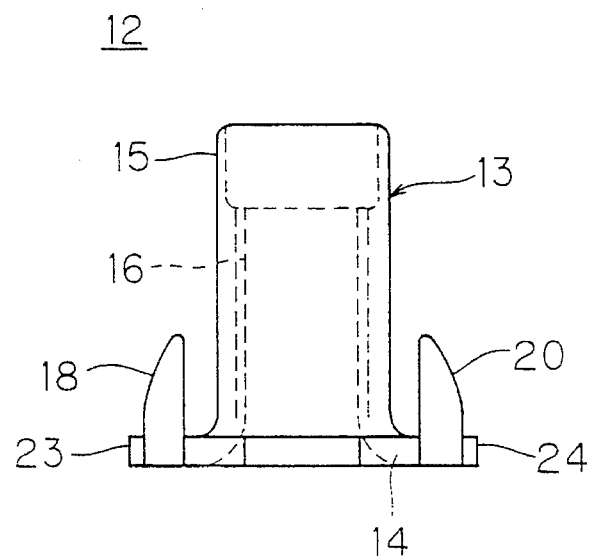
FIG. 13 is a front elevational view showing another conventional tee nut 12, which is of interest to the present invention.
Figure 14:
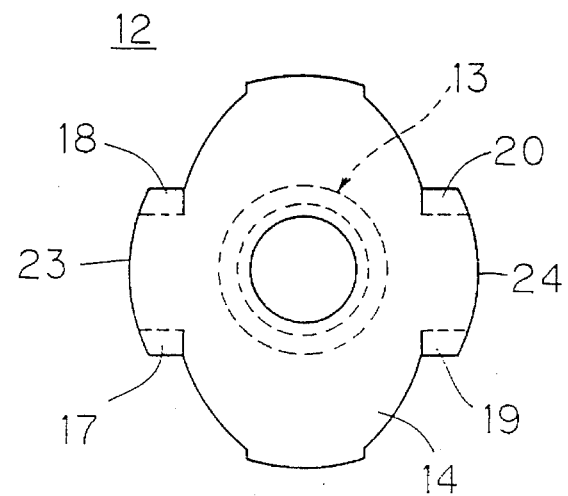
FIG. 14 is a bottom plan view of the tee nut 12 shown in FIG. 13.

The shaft 32 is in the form of a hollow cylinder having a uniform outer diameter similarly to the conventional tee nut 12 shown in FIGS. 13 and 14. The shaft 32 comprises a female screw forming portion 35, having a relatively small inner diameter and a relatively large thickness with a female screw threading 36 formed on its inner peripheral surface, which is provided on the first end, and a portion 34 to be caulked having a relatively large inner diameter and a relatively small thickness provided on a second end opposite to the first end. The thicknesses of the portion 34 to be caulked and the female screw forming portion 35 are so selected in the aforementioned manner that thread cutting for forming the female screw threading 36 can be started from either the first or second end of the shaft portion 32.

Figure 12:
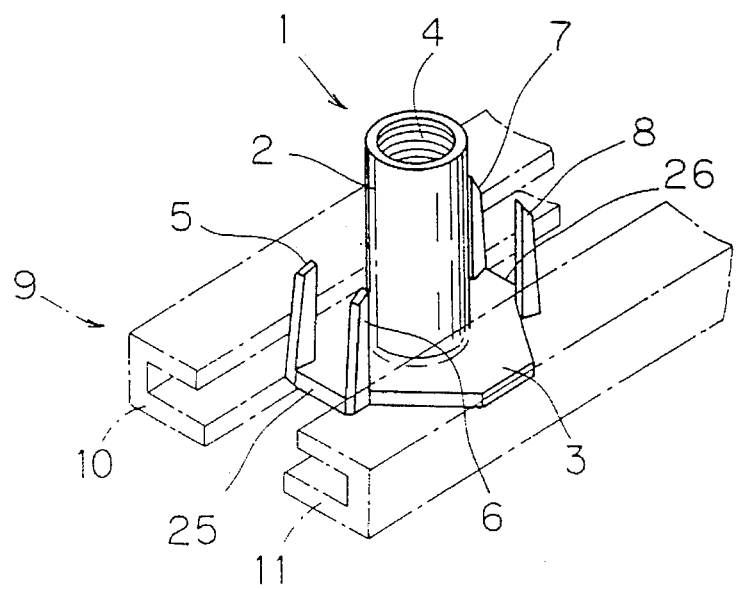
FIG. 12 is a perspective view showing a conventional tee nut 1, which is of interest to the present invention.

Similarly to the conventional tee nut 1 shown in FIG. 12, two pairs of pawls 37, 38, 39 and 40, extending from the first end toward the second end of the shaft 32, are arranged on the outer periphery of the flange 33 at positions opposite each other along a radial direction of the flange 33. These

7 pawls 37 to 40 are formed by upwardly bending parts of the outer peripheral edge of the flange 33. The pawls 37 to 40 are indented, notched or serrated respectively.

The flange 33 is substantially octagonal as a whole, similarly to the flange 3 shown in FIG. 12. In particular, the pair of pawls 37 and 38 and the other pair of pawls 39 and 40 are respectively coupled with each other through linear sides 41 and 42 of the flange 33.

FIG. 1 shows, in phantom lines, a feed track 43 for serially feeding a plurality of tee nuts 31. This feed track 43 comprises a pair of symmetrically arranged guide rails 44 and 45 having C-shaped sections, similarly to the feed track 9 shown in FIG. 12. The flanges 33 are received in the respective guide rails 44 and 45, between which the pawls 37 to 40 are located, so that the tee nuts 31 are guided and moved along the feed track 43. At this time, the linear side 41 or 42 of the flange 33 of each tee nut 31 faces the linear side 41 or 42 of the flange 33 of the next adjacent tee nut 31. Thus, the flange portions 33 are prevented from overlapping with the adjacent flanges 33.

Figure 15:
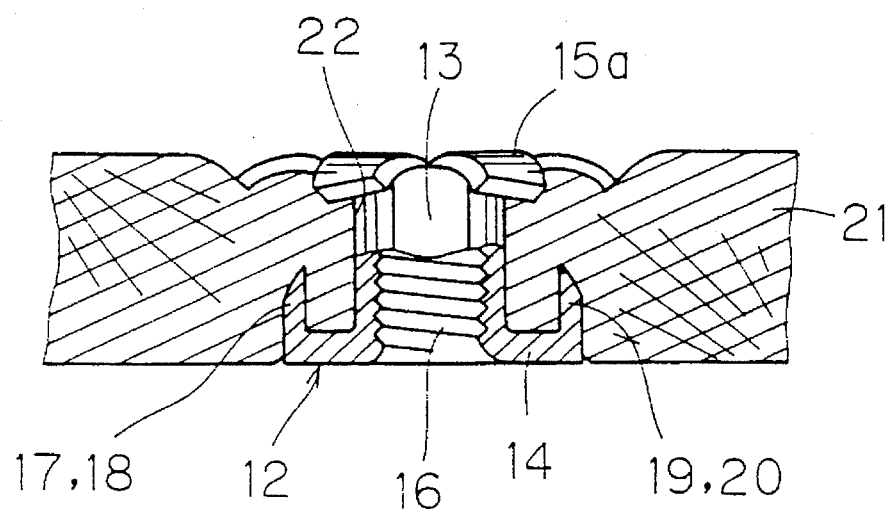
FIG. 15 is a sectional view showing an installed state of the tee nut 12 shown in FIG. 13.

Each tee nut 31 can be fixed to an object in the aforementioned mode shown in FIG. 15. Namely, the shaft 32 is inserted in a through hole which has previously been formed in the object, so that the portion 34 to be caulked is subjected to caulking and the pawls 37 to 40 bite into the object in this state. Thus, the tee nut 31 is strongly and semipermanently fixed to the object.

Figure 5:
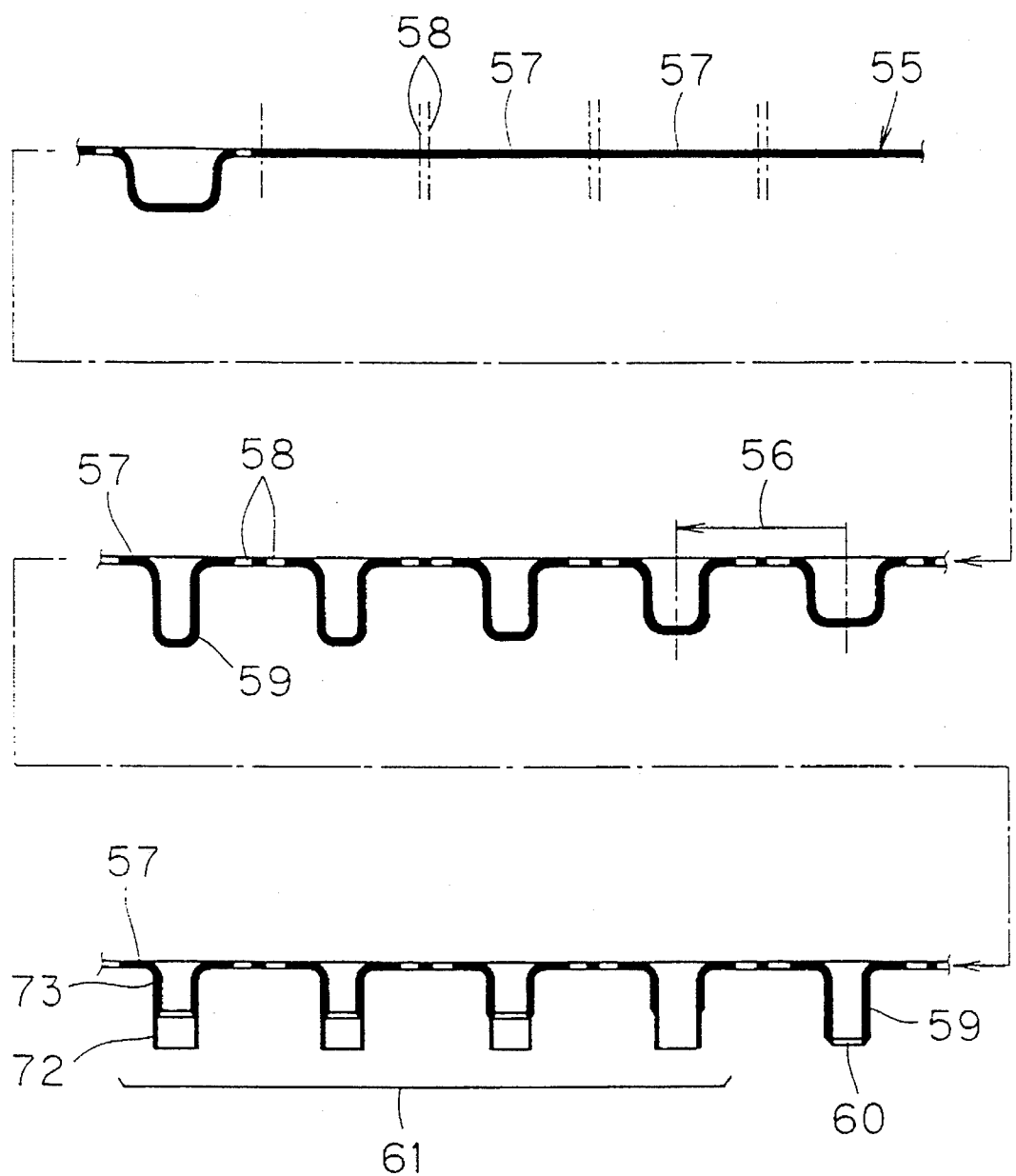
FIG. 5 is a sectional view showing states of working successively carried out on a metal plate 55 for obtaining the tee nut 31 shown in FIG. 1.

The aforementioned tee nut 31 shown in FIGS. 1 to 4 is manufactured as follows. Referring to FIG. 5, a longitudinal metal plate 55 of a ferrous material, for example, is prepared. This metal plate 55 is intermittently moved in its longitudinal direction at a prescribed movement step pitch along arrow 56, to be subjected to a desired working operation at each stop position.

In order to locate portions 57 for defining the flanges 33, cuts 58 are formed in the metal plate 55 around the portions 57. These cuts 58 are not provided entirely around the peripheries of the portions 57, but are so provided that deformable coupling points are defined to couple a plurality of points around the portions 57 with the remainder of the metal plate 55, so that the portions 57 are held by the remainder of the metal plate 55 while the portions 57 are subjected to various working steps.

Then, the metal plate 55 is subjected to drawing for swelling the centers of the portions 57 toward the lower major surface of the metal plate 55. This drawing is carried out in a plurality of stages, so that swollen portions 59 for defining the shafts 32 are formed in the final stage. Such swollen portions 59 are formed from the material of the portions 57 surrounded by the cuts 58 and attached to the metal plate 55 by coupling tabs between the cuts 58. During the swelling deformation, the open widths of the respective cuts 58 are increased or stretched wider.

Then, through holes 60 are provided in the forward end surfaces of the swollen portions 59.

Figure 6:
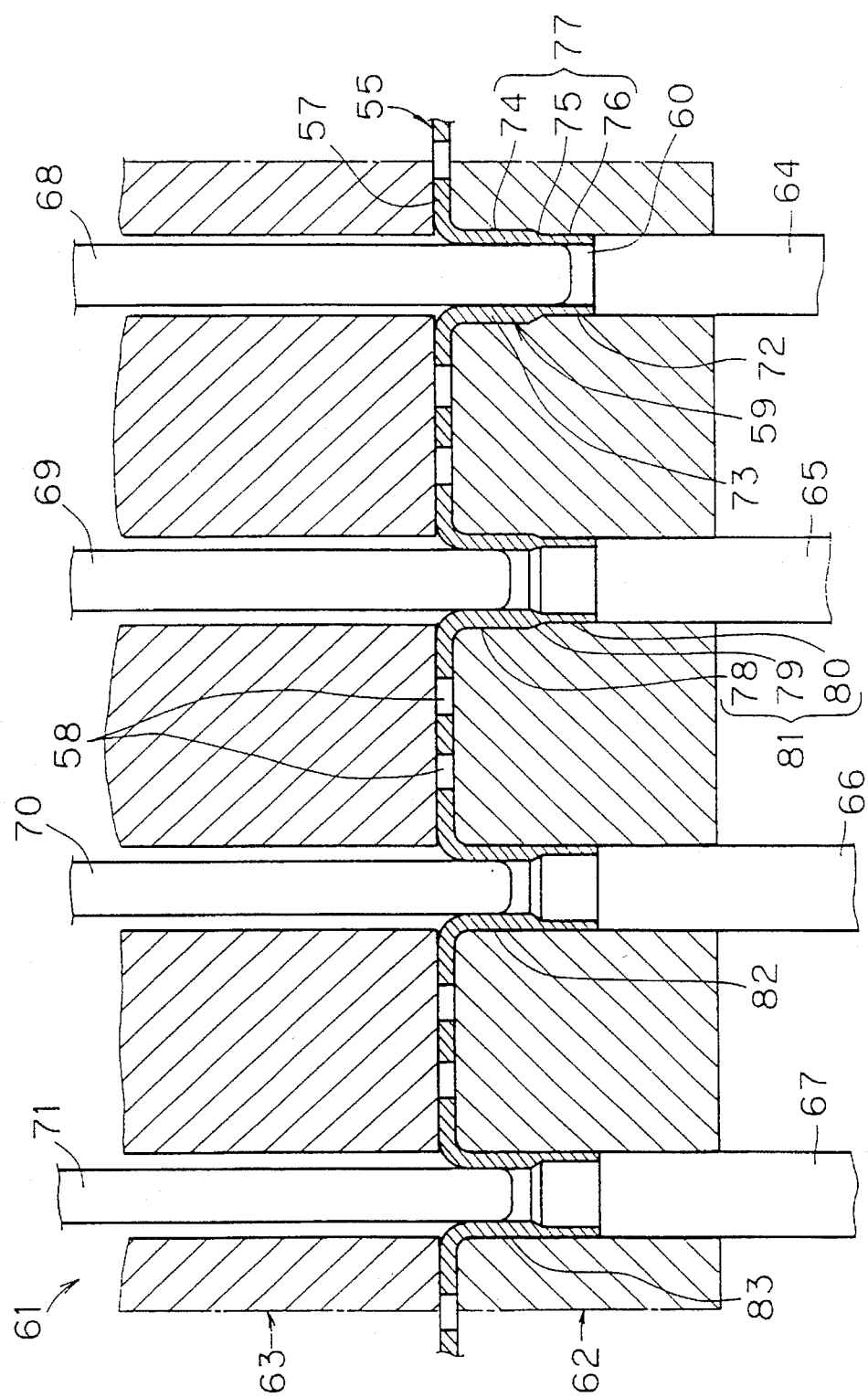
FIG. 6 is an enlarged detailed sectional view showing the working steps carried out in a working zone 61 shown in FIG. 5.

Then, the relatively thin portions 34 to be caulked are formed in a sequence of steps or working zone 61 shown in FIG. 5. FIG. 6 shows the working steps carried out in this working zone 61 in detail, in an enlarged manner.

Referring to FIG. 6, a forming die 62 and a clamp die 63 are arranged under and above the metal plate 55 respectively. The forming die 62 and the clamp die 63 are moved synchronously toward and away from the metal plate 55 to alternately clamp the metal plate 55 and then release the plate 55 so it can be moved in the direction of respective following working stations. The forming die 62 holds knockouts 64, 65, 66 and 67 in relation to respective working stations. On the other hand, the clamp die 63 holds punches 68, 69, 70 and 71 in relation to the respective working stations.

In working steps which are carried out in the respective working stations, the forming die 62 and the clamp die 63 clamp the metal plate 55 therebetween, so that the respective punches 68 to 71 are punched into inner peripheries of the swollen portions 59 from one end, i.e. the upper end, and the respective knockouts 64 to 67 support or contact the lower end surfaces of the swollen portions 59. The metal plate 55 is successively intermittently fed along arrow 56 (FIG. 5) upon such operations of the forming die 62, the clamp die 63, the knockouts 64 to 67 and the punches 68 to 71, so that the swollen portions 59 are successively worked as desired at the successive stations.

A first working station shown in the rightmost side of FIG. 6 is adapted to relatively reduce the outer diameter of a forward end portion 72 of each swollen portion 59 corresponding to the portion 34 to be caulked as compared with a base portion 73 corresponding to the female screw forming portion 35, so that the forward end portion 72 has a smaller wall thickness than the base portion 73. In more concrete terms, the forming die 62 is provided with a forging surface 77 which includes a large diameter portion 74, an inclined portion 75 and a small diameter portion 76. Thus, the punch 68 uniformly enlarges the inner diameter of each swollen portion 59 while the forging surface 77 controls the enlargement of the outer diameter of the forward end portion 72.

A second working station is adapted to reduce the outer and inner diameters of each base portion 73 while substantially maintaining its thickness. In more concrete terms, the forming die 62 is provided with another forging surface 81 including a large diameter portion 78 having a smaller inner diameter than the aforementioned large diameter portion 74, an inclined portion 79 and a small diameter portion 80. Thus, the forging surface 81 inwardly presses the outer peripheral surface of the base portion 73, while the punch 69 prevents the base portion 73 from undesired deformation at this time.

The third working station is adapted to further reduce the outer and inner diameters of each base portion 73 while substantially maintaining the thickness of the base portion 73, in continuation of the operation of the second working station. In more concrete terms, the forming die 62 is provided with a straight forging surface 82, which further inwardly presses the outer peripheral surface of the base portion 73, while the punch 70 functions similarly to the aforementioned punch 69. In the third working station, each swollen portion 59 is provided with a substantially uniform outer diameter.

A fourth working station is adapted to further increase uniformity in the outer peripheral surface of each swollen portion 59 by another straight forging surface 83 which is provided in the forming die 62.

Thereafter the pawls 37 to 40 (not shown) are formed on the outer periphery of each flange 33 by upward bending, and each portion 57 of such an intermediate product for defining the flange 33 is separated from the metal plate 55. This intermediate product is subjected to barrel polishing for removing flashes caused during the working.

Figure 7:
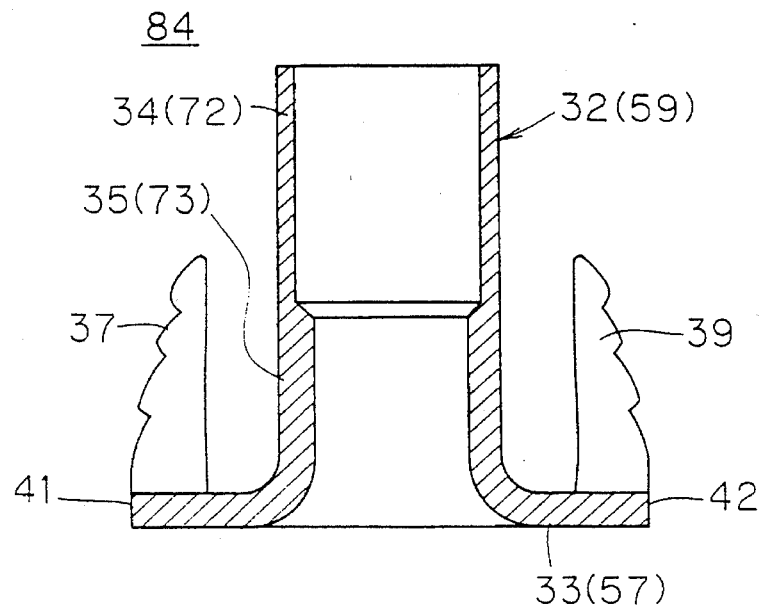
FIG. 7 is a sectional view corresponding to FIG. 4, showing an intermediate product 84 obtained through the working steps shown in FIG. 5.

FIG. 7 shows the aforementioned intermediate product 84. Referring to FIG. 7, elements corresponding to those shown in FIG. 4 are denoted by similar reference numerals, to represent the correspondence between the intermediate product 84 and the completed tee nut 31. In the intermediate product 84, the female screw threading 36 is not yet formed on the inner peripheral surface of the female screw forming portion 35 (the base portion 73 of the swollen portion 59) of the shaft 32. Thus, to obtain a finished tee nut 31 a step for forming the female screw threading 36 is then carried out on the inner peripheral surface of the female screw forming portion 35 of the shaft 32, as shown in FIG. 4.

Before the intermediate product 84 is separated from the metal plate 55, a drill may be applied to the forward end portion 72 of the swollen portion 59 to form a relatively thin portion for defining the portion 34 to be caulked, as hereinabove described. However, this method is impractical since chips resulting from drilling remain in the swollen portion 59 and it is quite troublesome to remove such chips.

It is also possible to manufacture various other types of tee nuts by methods which are substantially identical to that applied to manufacturing of the aforementioned tee nut 31, as follows.

Figure 8:
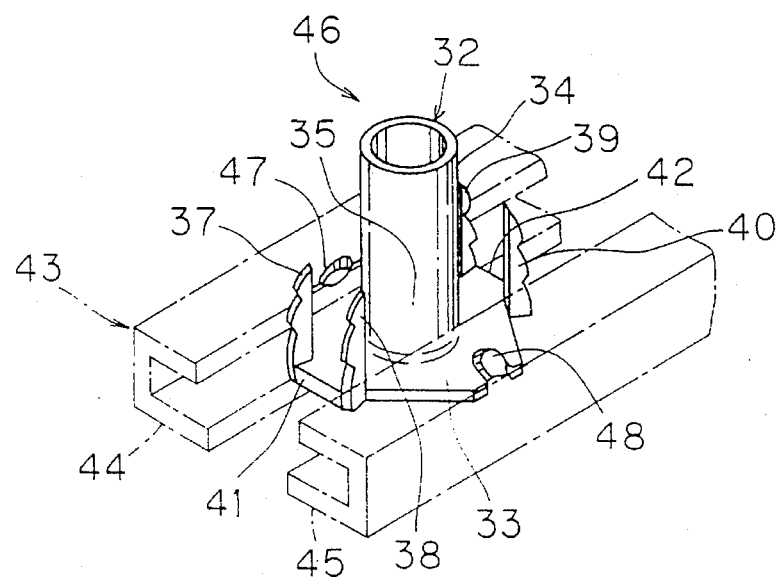
FIG. 8 is a perspective view showing a tee nut 46 obtained by a manufacturing method according to a second embodiment of the present invention.

FIG. 8 is a perspective view corresponding to FIG. 1, showing a tee nut 46 obtained by a manufacturing method according to a second embodiment of the present invention. This tee nut 46 includes a number of elements which are common to those of the aforementioned tee nut 31, and are denoted by similar reference numerals, to omit redundant description.

Protrusions 47 and 48 are provided on a peripheral edge of the tee nut 46 in opposite positions along a radial direction which is perpendicular to that along which the two pairs of pawls 37, 38, 39 and 40 are arranged respectively at opposite positions. These protrusions 47 and 48 project toward a second end of a shaft portion 32, similarly to the pawls 37 to 40. Such protrusions 47 and 48 are formed by inwardly crushing parts of the outer peripheral edge of a flange 33 from the exterior. Consequently, notches having substantially semicircular sections are left in the outer peripheral edge of the flange portion 33.

FIG. 8 shows a feed track 43 in phantom lines. When the flange 33 is received in respective guide rails 44 and 45 provided in the feed track 43, the protrusions 47 and 48 are located in the guide rails 44 and 45 respectively. In this manner, it is possible to substantially block clearances in the guide rails 44 and 45 with the protrusions 47 and 48.

Therefore, the flange 33 of the tee nut 46 is prevented from upward or tilting movement in the guide rails 44 and 45, and from overlapping with a flange 33 of an adjacent tee nut 46. Even if the protrusions 47 and 48 are in contact with the guide rails 44 and 45, it is possible to extremely reduce frictional resistance therebetween when the protrusions 47 and 48 have pointed forward ends. This also contributes to smooth movement of the tee nut 46 along the feed track 43.

Formation of the protrusions 47 and 48 is not restricted to the aforementioned method, but the protrusions 47 and 48 may alternatively be formed by bending parts of the peripheral edge of the flange 33 or pressing parts of the flange 33 in a direction perpendicular to its surface direction.

The tee nut 46 shown in FIG. 8 is different in inessential points from the tee nut 31 shown in FIG. 1, in addition to the provision of the protrusions 47 and 48. First, the shaft 32 of the tee nut 46 is longer than that of the tee nut 31, which demonstrates that the length of the shaft 32 can be changed in various ways as desired. Second, the indent or serration shapes of the pawls 37 to 40 of the tee nut 46 are slightly different from those of the tee nut 31. This shows that the indent shapes of the pawls 37 to 40 can be also changed in various ways.

Figure 9:
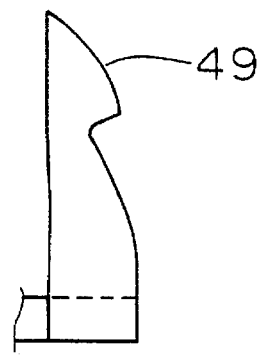
FIG. 9 is a front elevational view showing a pawl 49 of a tee nut obtained by a manufacturing method according to a third embodiment of the present invention.
Figure 10:
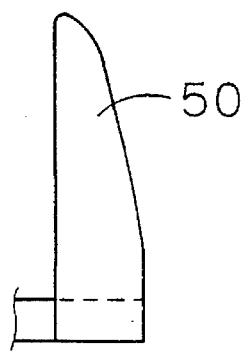
FIG. 10 is a front elevational view showing a pawl 50 of a tee nut obtained by a manufacturing method according to a fourth embodiment of the present invention.

FIGS. 9 and 10, each corresponding to a part of FIG. 2, show parts of tee nuts obtained by manufacturing methods according to third and fourth embodiments of the present invention respectively. These figures show modifications of pawls.

A pawl 49 shown in FIG. 9 is in the form of a hook. On the other hand, a pawl 50 shown in FIG. 10 is neither indented nor hook-shaped, but has a straight shape. Thus, the shapes of the pawls are not particularly restricted in the tee nut according to the present invention.

Figure 11:
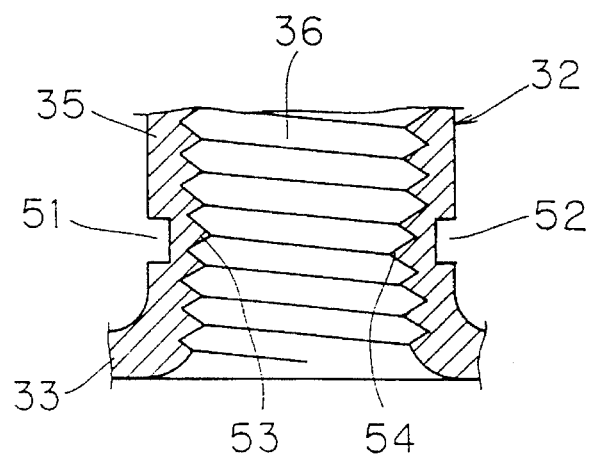
FIG. 11 is a sectional view showing a female screw forming portion 35 of a shaft portion 32 of a tee nut obtained by a manufacturing method according to a fifth embodiment of the present invention.

FIG. 11 shows a part of a tee nut obtained by a manufacturing method according to a fifth embodiment of the present invention, in correspondence to a part of FIG. 4. Referring to FIG. 11, elements corresponding to those shown in FIG. 4 are denoted by similar reference numerals, to omit redundant description. Parts of an outer peripheral surface of a female screw forming portion 35, which is provided on a shaft 32, are so inwardly crushed as to form two concave portions 51 and 52 with an angular space of 180°, for example. Such concave portions 51 and 52 are formed by holding prescribed parts of the female screw forming portion 35 with a pair of proper tools and strongly pressing these tools against the female screw forming portion 35. The concave portions 51 and 52 are preferably formed in positions which are close to a flange 33, because if the pair of tools are applied to a position distant from the flange 33, then the concave indented portions 51 and 52 are hardly formed but rather the crushed section of the shaft 32 is easily flatly deformed. Further, the concave portions 51 and 52 are preferably formed in a stage before formation of the pawls 37 to 40 (FIG. 1) in the flange 33, so that the pawls 37 to 40 will not hinder formation of the concave portions 51 and 52 in the vicinity of the flange portion 33.

Although the tee nut according to this embodiment is provided with two concave portions 51 and 52, the invention is not restricted to two of such concave portions, but the inventive tee nut may alternatively be provided with only one, or three or more concave portions, for example.

Upon formation of the concave portions 51 and 52, the thread of a female screw threading 36 is partially irregularized. Thus, a bolt (not shown) which is fitted into the female screw threading 36 cannot pass through such irregularized portions 53 and 54 unless the bolt is relatively strongly rotated. At this time, the thread may be partially crushed in the irregularized portions. Consequently, the bolt is locked into engagement with the female screw threading 36, and prevented from disengagement from the tee nut.

While the present invention has been described with reference to a method of manufacturing a tee nut having a substantially octagonal flange 33, the flange may have another angular shape. Further, the present invention is also applicable to manufacturing a tee nut having a substantially circular flange, for example, in place of an angular flange portion. In addition, the present invention is also applicable to manufacturing a tee nut having a flange without pawls.

Figure 16:
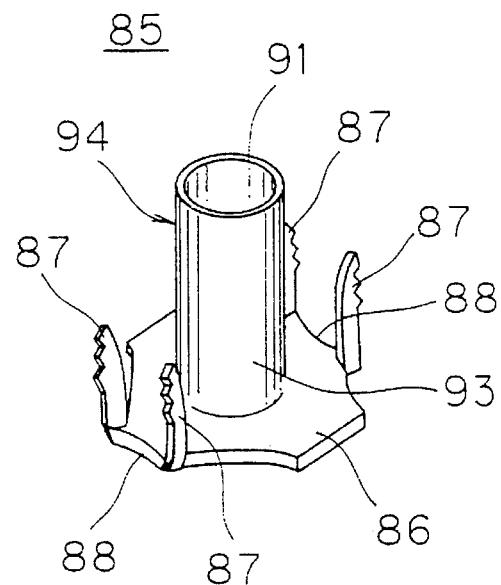
FIG. 16 is a perspective view showing a tee nut 85 obtained by a manufacturing method according to a sixth embodiment of the present invention.
Figure 17:
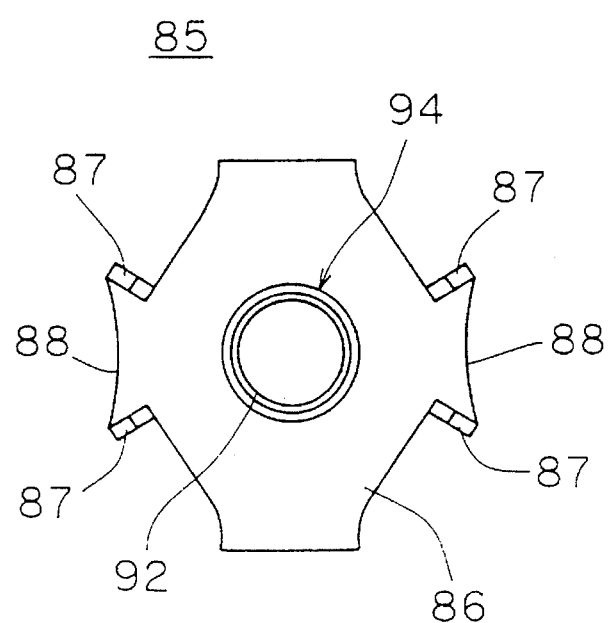
FIG. 17 is a plan view of the tee nut 85 shown in FIG. 16.
Figure 18:
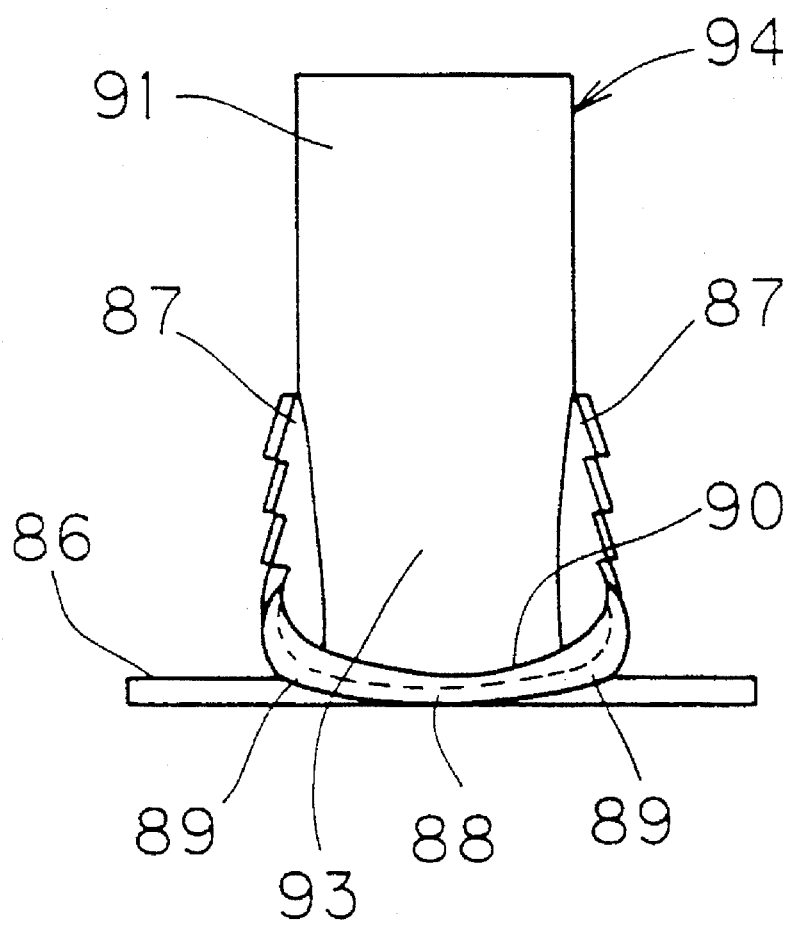
FIG. 18 is a side elevational view of the tee nut 85 shown in FIG. 16.

FIGS. 16 to 18 show a tee nut 85 of a "hopper feed tee nut" type, which is characterized by a particular shape of the outer peripheral edges of a flange 86 as compared with the tee nut 31 shown in FIGS. 1 to 4. Between pairs of pawls 87 which are close to each other, the outer peripheral edges of the flange 86 define concave arcuate edges 88 for providing cavities. As clearly understood from FIG. 18, both ends of each arcuate edge 88 forming base portions of the pawls 87 are provided with rounded shapes 89. Further, each arcuate edge 88 is formed with a burr 90 which protrudes in the same direction as the pawls 87. This tee nut 85 comprises a shaft 94 having a portion 91 to be caulked and a female screw forming portion 93 with a female screw threading 92 formed thereon, similarly to the aforementioned tee nut 31. Although the invention has been described with reference to specific example embodiments it will be appreciated that it is intended to cover all modifications and equivalents within the scope of the appended claims.

What is claimed is:

1. A method of manufacturing a tee nut including a shaft and a flange outwardly extending from a first end of said shaft, which shaft and flange are integrally made of metal, said shaft being in the form of a hollow cylinder having a uniform outer diameter and including a female screw forming portion, having a relatively small inner diameter and a relatively large thickness with a female screw threading being formed on its inner peripheral surface, being provided at said first end, and a portion to be caulked, having a relatively large inner diameter and a relatively small thickness, being provided at a second end opposite said first end, and two pairs of pawls extending from said first end toward said second end and being arranged on an outer periphery of said flange at positions opposite each other along a radial direction of said flange, wherein said flange has an angular shape with linear sides extending respectively between paired ones of said two pairs of pawls, said method comprising the following steps:

preparing a strip-shaped metal plate;

locating on said metal plate a specified portion for defining said flange;

forming cuts around said specified portion so as to leave only at least one deformable coupling tab connecting said specified portion with a remainder of said metal plate;

swelling a central part of said specified portion toward one major surface of said metal plate thereby forming a swollen cup for defining said shaft;

providing a through hole in a forward end surface of said swollen cup;

relatively reducing an outer diameter of a forward end portion of said swollen cup corresponding to said portion to be caulked as compared with an outer diameter of a base portion of said swollen cup corresponding to said female screw forming portion thereby reducing a wall thickness of said forward end portion to be smaller than a wall thickness of said base portion;

reducing outer and inner diameters of said portion while substantially maintaining said wall thickness of said base portion;

forming said female screw threading on an inner peripheral surface of said base portion;

separating said specified portion from said strip-shaped metal plate; and forming said two pairs of pawls at said outer flange.

2. The method of manufacturing a tee nut in accordance with claim 1, wherein said angular shape of said flange is a substantially octagonal shape.

3. A method of manufacturing a tee nut including a shaft and a flange outwardly extending from a first end of said shaft, which shaft and flange are integrally made of metal, said shaft being in the form of a hollow cylinder having a uniform outer diameter and including a female screw forming portion at said first end, and a portion to be caulked at a second end opposite said first end, said female screw forming portion having a relatively small inner diameter and a relatively large thickness with a female screw threading being formed on its inner peripheral surface, and said portion to be caulked having a relatively large inner diameter and a relatively small thickness said method comprising the following steps:

preparing a metal plate;

locating on said metal plate a specified portion for defining said flange;

swelling a central part of said specified portion toward one major surface of said metal plate thereby forming a swollen cup for defining said shaft;

providing a through hole in a forward end surface of said swollen cup;

relatively reducing an outer diameter of a forward end portion of said swollen cup corresponding to said portion to be caulked as compared with an outer diameter of a base portion of said swollen cup corresponding to said female screw forming portion thereby reducing a wall thickness of said forward end portion to be smaller than a wall thickness of said base portion;

then reducing outer and inner diameters of said base portion while substantially maintaining said wall thickness of said base portion; and forming said female screw threading on an inner peripheral surface of said base portion.

4. The method of manufacturing a tee nut in accordance with claim 3, wherein said metal plate is in the shape of a longitudinal strip, and wherein said steps of locating said specified portion, forming said swollen cup, providing said through hole, relatively reducing said outer diameter and said wall thickness of said forward end portion relative to said base portion and reducing said outer and inner diameters of said base portion are all carried out while said swollen cup remains attached to said strip-shaped metal plate and while feeding said strip-shaped metal plate along a progressive die.

5. The method of manufacturing a tee nut in accordance with claim 3, wherein said step of relatively reducing said outer diameter and said wall thickness of said forward end portion relative to said base portion comprises a step of uniformly enlarging said inner diameter of said base portion and an inner diameter of said forward end portion of said swollen cup while limiting enlargement of said outer diameter of said forward end portion.

6. The method of manufacturing a tee nut in accordance with claim 3, wherein said step of reducing said outer and inner diameters of said base portion comprises a step of actuating against said base portion a forming die that has a surface for inwardly pressing and deforming an outer peripheral surface of said base portion.

7. The method of manufacturing a tee nut in accordance with claim 3, wherein two pairs of pawls extending from said first end toward said second end are arranged on an outer periphery of said flange at locations opposite each other along a radial direction of said flange, said flange having an angular shape, wherein linear sides of said flange extend between respective paired pawls of said two pairs of pawls.

8. The method of manufacturing a tee nut in accordance with claim 4, further comprising a step of separating said specified portion for defining said flange from said strip-shaped metal plate.

9. The method of manufacturing a tee nut in accordance with claim 6, wherein said step of reducing said outer and inner diameters of said base portion is carried out in a plurality of stages.

10. A method of manufacturing a tee nut having a hollow cylindrical shaft, a flange extending radially from a first end of said shaft and at least two pawls extending from said flange toward a second end of said shaft opposite said first end, wherein said shaft has an internally threaded portion at said first end and a flarable portion at said second end, said threaded portion and said flarable portion have the same outer diameter, said threaded portion has a female threading formed therein with a relatively smaller inner diameter and said flarable portion has a relatively larger inner diameter; said method comprising:

(a) cutting slits substantially around a blank in a metal strip, while leaving at least one metal tab connecting said blank to said strip;
  (b) plastically deforming at least a central area of said blank to form a bulged cup having a substantially cylindrical sleeve, including a base portion nearer said metal strip and a distal portion further from said metal strip, and initially having a closed end surface at a distal end of said distal portion;
  (c) forming a hole through said closed end surface of said cup;
  (d) plastically deforming said cup so that said distal portion has a relatively smaller outer diameter and a relatively smaller wall thickness than said base portion;
  (e) further plastically deforming said cup, after said step (d), so that both an inner diameter and an outer diameter of said base portion are reduced while a wall thickness of said base portion is substantially maintained unchanged;
  (f) working a peripheral rim of said blank to substantially form said flange of said tee nut;
  (g) cutting said peripheral rim of said blank to form said pawls, and bending said pawls to extend toward said distal end;
  (h) separating said flange from said metal strip; and
  (i) forming said female threading in said base portion; wherein said base portion of said cup forms said internally threaded portion of said tee nut shaft and said distal portion of said cup forms said flarable portion of said tee nut shaft.

11. The method of claim 10, wherein said step (c) is performed before said step (d).

12. The method of claim 10, wherein said step (c) comprises removing material from said cup to form said hole.

13. The method of claim 10, wherein said step (d) is carried out so that said distal portion has the same inner diameter as said base portion.

14. The method of claim 10, wherein said step (e) further comprises maintaining said outer diameter and said wall thickness of said distal portion substantially unchanged while carrying out said reduction of said inner and outer diameters of said base portion.

15. The method of claim 10, further comprising maintaining a substantially unchanged length of said cup throughout said steps (c) to (e).

16. The method of claim 10, wherein said steps (b), (d) and (e) comprise inserting male forming plungers into said cup only from an end of said base portion at said metal strip and not from said distal end of said distal portion.

17. The method of claim 10, wherein said steps (f) and (g) are performed before said step (h), and said step (i) is performed after said step (h).

18. The method of claim 10, further comprising radially inwardly deforming said base portion at at least one point located axially nearer said flange than said distal portion to form an indent and an altered threading characteristic at said indent in said internally threaded portion of said tee nut.

19. The method of claim 10, further comprising inwardly crushing a peripheral edge of said flange at at least one location spaced substantially equally between said at least two pawls to form a protruding tab extending from said flange toward said distal end.

20. The method of claim 10, wherein said steps (f) and (g) are carried out to form said flange to have a substantially straight-sided polygon shape, and to form said at least two pawls as two pairs of pawls, wherein a respective straight side of said polygon shaped flange extends between two pawls of each of said two pairs.

* * * * *